United States Patent [19]

Pluijms et al.

[11] Patent Number: 4,854,956

[45] Date of Patent: Aug. 8, 1989

[54] METHOD OF MANUFACTURING OPTICAL FIBRES HAVING A CORE AND A CLADDING OF GLASS APPLYING THE ROD-IN-TUBE TECHNIQUE

[75] Inventors: René A. M. Pluijms; Emmanuel Papanikolau; Leendert B. Jongeling; Johannes M. A. Van Esdonk, all of Eindhoven, Netherlands

[73] Assignee: U.S. Philips Corp., New York, N.Y.

[21] Appl. No.: 256,067

[22] Filed: Oct. 6, 1988

Related U.S. Application Data

[63] Continuation of Ser. No. 62,920, Jun. 16, 1987, abandoned.

[30] Foreign Application Priority Data

Jul. 14, 1986 [NL]  Netherlands ......................... 8601830

[51] Int. Cl.$^4$ ............................................. C03B 37/012
[52] U.S. Cl. .......................................... 65/2; 65/3.11; 65/17; 65/61; 65/65; 65/120
[58] Field of Search ..................... 65/2, 3.11, 3.12, 17, 65/61, 65, 120

[56] References Cited

U.S. PATENT DOCUMENTS

| | | | |
|---|---|---|---|
| 3,811,857 | 5/1974 | Deeg et al. | 65/65 R |
| 4,345,928 | 8/1982 | Kawachi et al. | 65/3.12 X |
| 4,491,463 | 1/1985 | Weinstein et al. | 65/2 |

FOREIGN PATENT DOCUMENTS

| | | | |
|---|---|---|---|
| 51-81143 | 7/1976 | Japan | 65/3.11 |
| 62-21724 | 1/1987 | Japan | 65/2 |

OTHER PUBLICATIONS

Dr. G. Koel, "Technical and Economic Aspects of the Different Fiber Fabrication Processes" in Proc. 8th European Conf. on Optical Communication (8ECOC), Cannes, Sep. 1982.

Primary Examiner—Robert L. Lindsay
Attorney, Agent, or Firm—Ernestine C. Bartlett

[57] ABSTRACT

The invention relates to a method of manufacturing optical fibres in which a quartz glass tube is coated on the inside with core material, the assembly is contracted to form a solid rod which is then inserted into a quartz glass tube, after which the assembly is drawn. The last tube is thermally treated to eliminate contaminations at the surface which may detrimentally influence the tensile strength of the ultimate fibre.

4 Claims, No Drawings

METHOD OF MANUFACTURING OPTICAL FIBRES HAVING A CORE AND A CLADDING OF GLASS APPLYING THE ROD-IN-TUBE TECHNIQUE

This is a continuation of application Ser. No. 062,920, filed June 16, 1987, now abandoned.

FIELD OF THE INVENTION

The invention relates to a method of manufacturing optical fibres having a core and a cladding of glass applying the so-called rod-in-tube technique.

BACKGROUND OF THE INVENTION

The rod-in-tube technique is well-known in the art. In this technique a rod of a core material is usually placed in a tube of cladding material and the assembly, optionally after the tube has first been contracted on the rod by a thermal treatment, is drawn to form an optical fibre.

It was established that in a modified embodiment of this method in which the rod consists of a core material and a cladding of quartz glass the optical fibre obtained by means of the rod-in-tube technique sometimes did not satisfy certain minimum requirements as regards the tensile strength.

It was found that fracture occurring upon determining the minimum tensile strength (screen test) in such a case usually is the result of contaminations which are present at the outer surface or in a zone of low depth below the outer surface of the quartz glass tube in which the rod is placed.

The said contaminations may be oxides having a higher melting point than quartz glass, such as aluminum oxide, chromium oxide and zirconium dioxide. In commercially available quartz glass tubes manufactured from quartz crystals, both alien particles and conglomerates of alien particles have been found to occur usually immediately below the outer surface of the tube.

These particles probably originate from the manufacturing process. The dimensions of the said conglomerates in the axial and tangential directions of the tube are at most 100 $\mu$m. They are present directly below the outer surface in a zone having a thickness of 10 $\mu$m.

Etching such quartz glass tubes with the object of removing the contaminated surface zone is possible, for example, by means of a hydrofluoric acid solution. However, small pits are formed in the surface while it is found in practice that the contaminations which adversely influence the tensile strength are difficult to remove entirely in this manner.

The invention is based on the recognition that contaminations in the form of oxidic particles can be dissolved to a sufficient extent by means of a thermal treatment to eliminate the adverse effect of said particles on the mechanical properties of the finished optical fibre.

The method according to the invention is characterized in that the following steps of the method are carried out in the following sequence:

a layer of core glass is provided on the inside of a tube of quartz glass;

the internally coated tube is contracted to form a solid rod of the same or substantially the same length;

the outer surface of a tube of quartz glass is heated at a temperature of 2100° C. or higher for a period of time which is sufficient to dissolve contaminations consisting of high-melting-point oxides which are present in a surface layer at a depth of 10 $\mu$m to a sufficient extent to eliminate the adverse effect on the mechanical properties of the finished optical fibre;

the solid rod is placed in the thermally pretreated tube of quartz glass;

after which the assembly of rod and thermally pretreated tube is drawn to form an optical fibre.

In this method the detrimental particles disappear entirely or their dimensions become so small that the critical fracture limit is no longer exceeded by the dimension of the particles, the critical fracture limit being that set forth in Griffith's law which says that the critical fracture limit is proportional to the root from the reciprocal length of a discontinuity.

In the method according to the invention the known internal deposition methods for the manufacture of optical fibres may be used, for example, MCVD (modified chemical vapour deposition) and PCVD (plasma activated chemical vapour deposition). See, for example, the article by Dr. G. Koel: "Technical and Economic Aspects of the Different Fibre Fabrication Processes", in Proc. 8th European Conf. on Optical Communication (8 ECOC), Cannes, Sep. 1982, p. 108.

The contracting of the internally coated tube takes place in the usual manner by means of a thermal treatment in which the tube is contracted to form a rod under the influence of the surface stress and pressure difference. During the contraction the tube is rotated. The length of the rod is equal or substantially equal to that of the starting tube. The resulting rod is placed in the quartz glass tube. The inside diameter of the tube need only be so much larger than the diameter of the rod that the latter can easily be inserted into the tube. Before the rod is placed in the quartz glass tube, the latter is subjected to a thermal treatment. It is sufficient when the tube is heated to a temperature of 2100° C. or higher down to a depth of approximately 10 $\mu$m.

Suitable means to perform such a heating are thermal sources which can transfer a large amount of thermal energy in a short period of time, for example, a hydrogen-oxygen burner or a plasma burner.

A plasma burner is preferably used in which the plasma is formed in a gas which consists at least partly of a molecular gas, for example nitrogen and oxygen. The energy transfer of such a plasma to the surface to be heated takes place substantially by recombination of dissociated molecules at the surface. The binding energy of the molecules of the gas is released. This leads to very high temperatures in a thin surface layer so that conglomerates of alien particles can be dissolved in the quartz glass within a few seconds.

It has been found advantageous in practice to subject the outer surface of the tube of quartz glass to a wet-chemical etching treatment before the outer surface is heated to a temperature of $\geq 2100°$ C. Etching may be carried out, for example, by means of an aqueous hydrofluoric acid solution, for example, a solution of 15-20% by weight of HF in water. Upon etching with hydrofluoric acid the conglomerates of alien particles are not attacked or hardly attacked but the surrounding quartz glass is attacked. After reaching a certain etching depth (approximately 10 $\mu$m) parts of conglomerates work loose from the surface already with very low forces; such forces occur, for example, upon rinsing away the etchant. The resulting cavities in the surface are closed within a few seconds in the subsequent thermal treatment at a temperature of ≧2100° C., alien particles, if any, still present in the cavities dissolving. Preferably, during the thermal treatment, the inside of the tube of quartz glass is brought and maintained at a pressure exceeding the ambient pressure. The overpressure is, for example, approximately 50 Pa. As a result of this, variations of the inner and outer diameters of the tube in an uncontrollable manner by contraction of the tube under the influence of surface stress. In this manner, however, it is also possible, by a suitable choice of the overpressure and thermal treatment, to bring the tube at a diameter smaller than the starting diameter in a controllable manner and hence to obtain a better fitting between rod and outer tube.

In a modified embodiment of the method according to the invention the resulting rod is placed in a quartz glass tube after which the quartz glass tube is contracted on the rod to form a solid assembly. The outer surface of the solid assembly is then heated at a temperature of 2100° C. or higher for a period of time which is effective to sufficiently dissolve contaminations consisting of high-melting-point oxides which are present in a surface layer at a depth of 10 μm to eliminate the adverse effect on the mechanical properties of the finished optical fibre. In a subsequent step the thermally treated solid assembly is drawn to form an optical fibre.

In this modified embodiment of the method in accordance with the invention it is also recommendable to subject the outer surface of the quartz glass tube to a wet-chemical etching treatment. Said treatment is preferably carried out before the tube is united with the rod to form a solid assembly.

EXAMPLE

Commercially available quartz glass tubes of a purity sufficient to be used in the manufacture of optical fibres showed at their outer surfaces conglomerates of substantially $ZrO_2$ particles having a dimension in the tangential and axial directions between 10 and 100 μm. The thickness of conglomerates was a few μm to a maximum of 10 μm. After contracting a tube on a rod and drawing to form a fibre without any attempts having been made to remove or dissolve the conglomerates it was found that fracture in the relative screen test nearly always was the result of the presence of conglomerates of $ZrO_2$ particles on and closely below the surface of the fibre.

When the surface of the quartz glass tube was subjected to a wet-chemical etching treatment, for example, with a 15% by weight aqueous HF solution, it was found that the conglomerates of $ZrO_2$ particles are not or hardly attacked. The quartz glass around the conglomerates was attacked indeed. When a critical etching depth of approximately 10 μm was reached, parts of the conglomerates worked loose under the influence of small forces, for example, upon rinsing with water to remove the etchant. However, in this manner a rough surface is obtained. In a thermal treatment at 2100° C. or higher, however, the rough surface disappears within a few seconds and the remaining contaminations dissolve.

The effect of the thermal treatment at 2100° C. was established by measuring the zirconium concentration profile by means of EDAX at the surface. It was found that this concentration profile, as appears from table 1, depends on the duration of the treatment.

TABLE 1

| Diameter zirconium inhomogeneity during the $ZrO_2$—diffusion by means of thermal treatment | Duration of the treatment at 2100° C. in seconds |
| --- | --- |
| 108 μm | 2 |
| 156 μm | 3 |
| 200 μm | 4 |

It was found that $ZrO_2$ dissolves by diffusion. A zirconium-rich glass spot results in which the diameter increases with time. Such a spot has no noticeable influence on the tensile strength determined according to the screen test, as appears from the following table 2:

TABLE 2

Rejects in the relative screen test as a result of glass defects in %

(A) Without thermal treatment: approximately 35%
(B) With wet-chemical etching and thermal treatment according to the invention: 1% or less The diameter of the fibre in all the cases was 125 μm.

The fibre had been obtained by deposition of a core glass on the inner wall of a tube of quartz glass. After contraction to form a solid rod, a cladding of quartz glass was provided by means of the rod-in-tube technique. After drawing the fibre the core diameter was 50 μm.

In the screen test, the whole length of an optical glass fibre drawn from a preform is subjected to a constant force for a certain period of time.

The object of this test is to establish whether the optical glass fibre length comprises discontinuities which may give rise to fracture when the optical glass fibre is subjected to a much smaller force than that used in the screen test.

What is claimed is:

1. A method of manufacturing optical fibers having a core and a cladding of glass derived by a rod-in-tube method comprising the steps of:
   (a) providing a layer of core glass coated on the inside of a first tube of quarts glass;
   (b) contracting the internally coated tube to form a solid rod of the same or substantially the same length as the first tube;
   (c) heating the outer surface of a second quartz glass tube at a temperature of at least 2100° C. for a period of time sufficient to dissolve high-melting-point oxides which are present in a surface layer to a depth of about 10 μm to substantially eliminate the adverse effect said oxides exert on the mechanical properties of optical fibers subsequently produced therefrom;
   (d) placing the rod resulting from said first tube in the thermally pre-treated second quartz glass tube to form an assembly; and
   (e) drawing the assemby to form an optical fiber.

2. A method as claimed in claim 1 wherein the surface of the second tube is subjected to a wet-chemical etching treatment before the outer surface is heated at a temperature above 2100° C.

3. A method as claimed in claim 2 wherein the outer surface of the second tube is heated at a temperature above 2100° C. by means of a plasma formed in a gas which consists at least partly of a molecular gas.

4. A method as claimed in claim 1 wherein the interior of the second tube during the thermal treatment is at a pressure exceeding the ambient pressure.

* * * * *